E. DOBARTZ & W. H. SIGLEY.
FUNNEL.
APPLICATION FILED JUNE 6, 1911.
1,027,378.
Patented May 21, 1912.
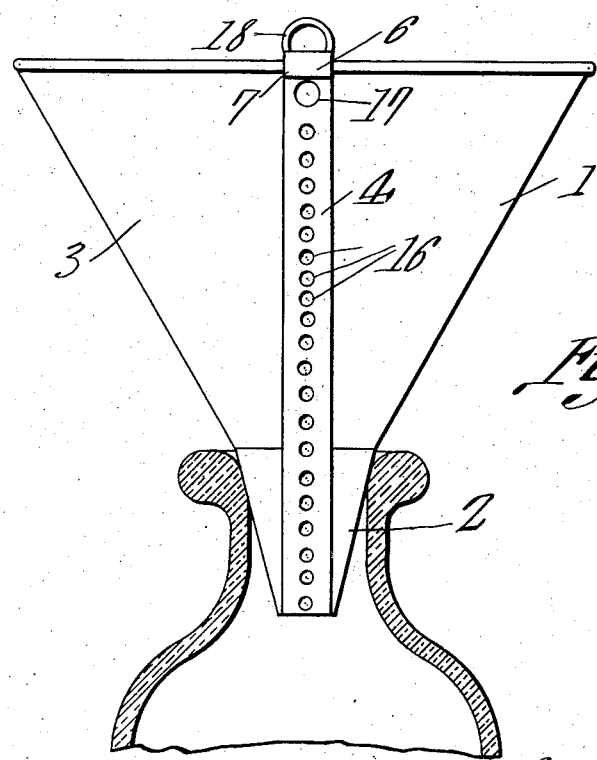
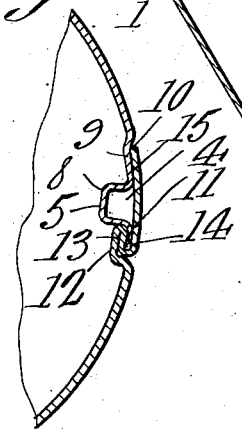
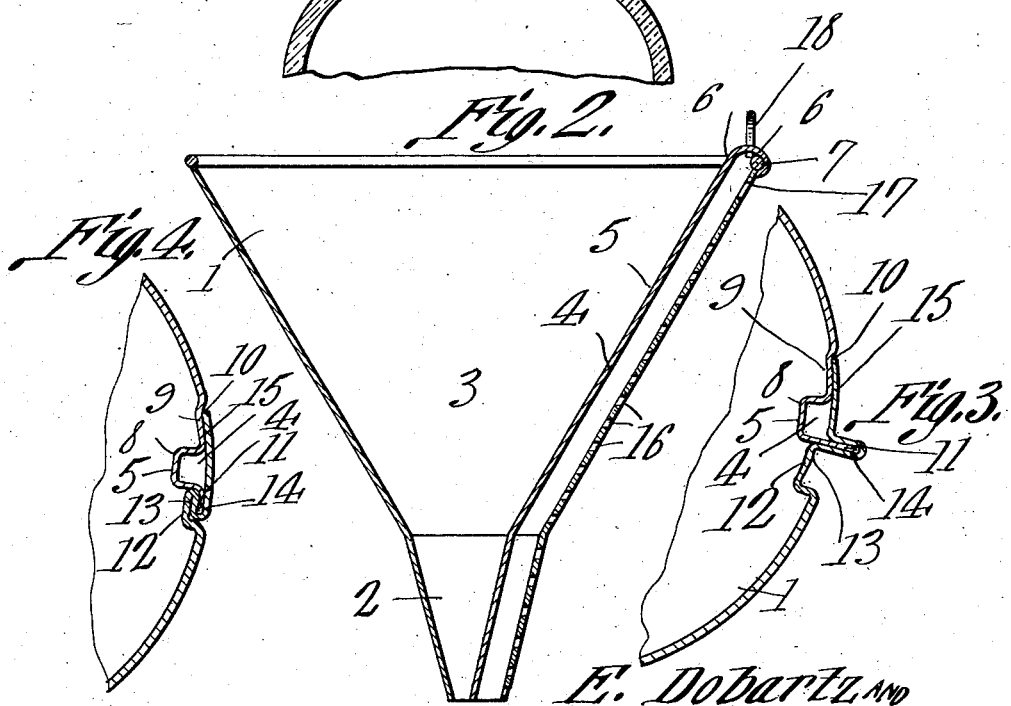
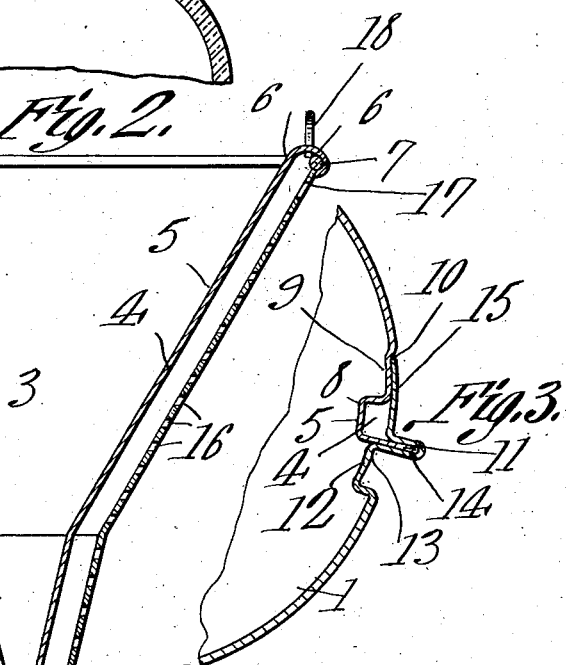
Witnesses
E. Dobartz and
W. H. Sigley, Inventors
by C. A. Snow & Co.
Attorneys
COLUMBIA PLANOGRAPH CO., WASHINGTON, D. C.

UNITED STATES PATENT OFFICE.

EDWARD DOBARTZ AND WILLIAM H. SIGLEY, OF SYLVAN GROVE, KANSAS; SAID DOBARTZ ASSIGNOR TO SAID SIGLEY.

FUNNEL.

1,027,378.  Specification of Letters Patent.  Patented May 21, 1912.

Application filed June 6, 1911. Serial No. 631,510.

*To all whom it may concern:*

Be it known that we, EDWARD DOBARTZ and WILLIAM H. SIGLEY, citizens of the United States, residing at Sylvan Grove, in the county of Lincoln, State of Kansas, have invented a new and useful Funnel, of which the following is a specification.

This invention relates to improvements in funnels.

The invention has for its object to promote its efficiency in effecting the filling-action.

A further object is to provide for the maximum filling of the liquid-receiving vessel or receptacle without overflowing of the liquid while being poured thereinto.

A still further object is to provide for the ready cleaning of the filling device or funnel, especially as when required for use in connection with heavy oils or hydro-carbons.

A still further object is to accommodate the funnel or filling device to the vessel or receptacle to be filled regardless of the size of the neck of said vessel or receptacle.

A still further object is to carry out the aforesaid ends in a simple, expeditious and effective manner.

The invention consists of certain instrumentalities and features substantially as hereinafter fully disclosed and defined by the claims.

In the accompanying drawing illustrating the preferred embodiment of our invention, wherein it will be understood that various changes and modifications may be made as relates to the details of the construction and arrangement of the parts without departing from the spirit of the invention—Figure 1 is an elevational view of the device or funnel as applied to the neck of a receptacle or bottle, the latter being shown in section and fragmentarily. Fig. 2 is a sectional elevation of the funnel. Fig. 3 is a fragmentary horizontal section of the same, disclosing more particularly the crimping of the funnel body initially as in forming the ventilating shaft therefor. Fig. 4 is a like view of the funnel also showing said shaft-forming crimping operation, as when the same is concluded.

In carrying out our invention, we construct the funnel or tunnel 1 in the usual general outline, the same having a base tapered or tubular member or delivery end 2 and an upper flared body-portion or member 3, said members being suitably united in the well known way of seaming, these all however forming no material part of our invention.

The body and base or tubular members have formed within the cross-sectional area thereof a continuous ventilating shaft or passage 4, traversing the funnel or tunnel longitudinally from top to bottom, said passage or shaft having its inner imperforate wall 5 conforming to the general trend of the walls of said body and tubular portion, said wall being so conformed as to form in its union with said walls an interior area or bore which will adequately serve for ventilating purposes and yet prevent a liquid from rising thereinto. The upper end of the inner or imperforate wall 5 of the ventilating passage or shaft 4 is carried over, and forms a closure, as at 6, for the upper end of the latter, said closure also being suitably extended or carried over the upper beaded edge of the funnel body, and crimped thereunder, as at 7 to prevent the entrance of water or liquid to the ventilating shaft especially when filling or pouring liquid or water into the tunnel. The inner imperforate wall 5 is formed from, or rather is an integral portion of the body-member 3 of the tunnel, said wall-forming portion which is a continuation of a longitudinal edge thereof, being inwardly bent preferably in general rectangular outline as seen in Figs. 3 and 4, as at 8, the same however being initially depressed as at 9 to form a seat or depression 10 facing outwardly. Said wall-forming portion is extended as at 11 radially to, and beyond the lateral or arcuate portion of the body-member 1 of the funnel or tunnel. Said body member, it will be observed is formed laterally of the wall 5, along the opposite longitudinal edge of the body-member, with an inwardly bent portion 12, the same forming a somewhat deeper seat or depression 13 than the seat or depression 10, said portion 12 then being extended outwardly to form a pocket 14 to receive the extension 11 of the wall-forming portion 8, the free-end portion or terminal 15 of the portion 12 being finally received by the depression or seat 10 of the inwardly depressed portion 9 of said body-member, all as disclosed by Figs. 3 and 4. It will be thus seen that, by now forcing or hammering down the parts 11 and 14, causing the same to follow the direction of the arrow as indicated in Fig. 3, these parts will take the position indicated in Fig. 4, the pocket 14 with the terminal or extension 11, being received by the seat 13 and the resulting outer forming portion of the pocket 14 being brought into alinement with the portion 15, and into coincidence with the curvilinear outline of the body-member, thus providing for effectively crimping the parts into secured or locked position as is apparent from Fig. 4, the same being suitably soldered or brazed in the usual way.

A plurality of, or numerous perforations or openings 16 are suitably produced and quite closely together throughout the entire outer wall of the shaft or passage 4, to form air or vent passages, said wall, it being seen, extending throughout the length of the nozzle or tapered member as well as that of the body or flared member, the venting perforations or openings therefore, being disposed or adapted to provide for effecting communication between the inside air of the chamber or receptacle, to which the funnel or tunnel may be applied, and the outside air or atmosphere, which communication, of course, is above the contents or liquid in said receptacle, through the funnel. The uppermost perforation or orifice designated as 17 provides for the convenient or ready insertion of a swab, or other suitable cleaning instrument (not shown), therethrough, and into the shaft or passage for readily cleaning the same, especially as is required in using the device or funnel in connection with filling vessels or receptacles with heavy oils, as hydro-carbons.

It will be noted that the air-passages or perforations allow by their closely arranged relation and other conditions as above recited, of the escape of air, or a venting action, although the delivery or lower end of the nozzle-member may be submerged or below the water level in the receptacle or vessel being filled. Also the venting openings or perforations in the funnel-body are relatively so arranged or spaced that they provide for a complete distribution of air, thus preventing not only any overflow-tendency or bubbling of the liquid which it might otherwise have, but also a siphoning action as would otherwise take place, this spacing or arranging of said venting openings providing for placing them about a quarter of an inch apart. Also it is observed that by reason of the air or venting shaft thus being equipped throughout from top to bottom with the air-passages, the device or tunnel may be used in connection with receptacles or vessels having large or small necks.

A suitable bail or contrivance 18 may be employed for suspending the funnel or tunnel out of the way or in position, when not required for use, the upper end closure 7 of the venting shaft being preferably utilized for the point of attachment of said suspending bail or contrivance.

It will be observed that we have produced a device of the character described which is simple in structure, inexpensive of manufacture, effective in action and adapted to be used in connection with receptacles or bottles regardless of the size or cross sectional area of the opening of the neck thereof.

What is claimed is:—

1. A funnel including a body-member and a nozzle-member, said body and nozzle members having an air venting shaft extending from the lower end of said nozzle-member to the upper end of said body-member, said air-venting shaft having numerous closely arranged air-passages through its outer wall, said shaft being formed from an inwardly extending longitudinal portion of said body and nozzle members along an edge thereof and a like inwardly extending longitudinal portion along the opposed edge of said members, the latter longitudinal inwardly extending portion being formed with a pocket receiving the free-edge terminal of the former longitudinal portion, said pocket being received by a seat of said latter longitudinal portion and said pocket, with said free-edge terminal received thereby, being crimped into locked position, said latter longitudinal portion having its free-edge terminal also received by a seat of the former longitudinal portion.

2. A funnel including a body-member and a nozzle member, said body and nozzle members having an air-venting shaft extending from the lower end of said nozzle-member to the upper end of said body-member, said air venting shaft having numerous air-passages in its outer wall extending throughout its length from top to bottom, the inner wall of said shaft being imperforate throughout its length, with the upper end thereof overlapping the upper end of the shaft and crimped over the upper outer edge of the funnel-body, the overlapping portion providing for the attachment of a suspending member thereto.

In testimony that we claim the foregoing as our own, we have hereto affixed our signatures in the presence of two witnesses.

EDWARD DOBARTZ.
WILLIAM H. SIGLEY.

Witnesses:
GEORGE H. WELLS,
C. E. LEWELLEN.

Copies of this patent may be obtained for five cents each, by addressing the "Commissioner of Patents, Washington, D. C."